United States Patent
Rindal et al.

(10) Patent No.: US 12,549,350 B2
(45) Date of Patent: Feb. 10, 2026

(54) FAST SOLVERS FOR SPARSE STRUCTURED LINEAR SYSTEMS

(71) Applicant: VISA INTERNATIONAL SERVICE ASSOCIATION, San Francisco, CA (US)

(72) Inventors: Peter Rindal, Sunnyvale, CA (US); Srinivasan Raghuraman, Cambridge, MA (US)

(73) Assignee: Visa International Service Association, San Francisco, CA (US)

( * ) Notice: Subject to any disclaimer, the term of this patent is extended or adjusted under 35 U.S.C. 154(b) by 220 days.

(21) Appl. No.: 18/580,138

(22) PCT Filed: Jul. 15, 2022

(86) PCT No.: PCT/US2022/037302
§ 371 (c)(1),
(2) Date: Jan. 17, 2024

(87) PCT Pub. No.: WO2023/003774
PCT Pub. Date: Jan. 26, 2023

(65) Prior Publication Data
US 2025/0007705 A1    Jan. 2, 2025

Related U.S. Application Data

(60) Provisional application No. 63/223,349, filed on Jul. 19, 2021.

(51) Int. Cl.
*H04L 9/08*    (2006.01)
(52) U.S. Cl.
CPC ................................. *H04L 9/0869* (2013.01)

(58) Field of Classification Search
CPC ....... H04L 9/0869; H04L 9/0894; H04L 9/08; G06F 21/602; G06F 17/16
See application file for complete search history.

(56) References Cited

PUBLICATIONS

Ali et al., "Harnessing Correlations in Distributed Erasure-Coded Key-Value Stores", Available Online at: https://arxiv.org/pdf/1708.06042.pdf, Mar. 9, 2019, 24 pages.
Geppert et al., "Random Projections for Bayesian Regression", Statistics and Computing, vol. 27, 2017, pp. 79-101.
Kang et al., "DialGraph: Sparse Graph Learning Networks for Visual Dialog", Available Online at: https://arxiv.org/pdf/2004.06698v1.pdf, Apr. 14, 2020, 17 pages.
Khodja et al., "Parallel Sparse Linear Solver with GMRES Method Using Minimization Techniques of Communications for GPU Clusters", Journal of Supercomputing, vol. 69, No. 1, Mar. 2014, 19 pages.

(Continued)

*Primary Examiner* — Quazi Farooqui
(74) *Attorney, Agent, or Firm* — Kilpatrick Townsend & Stockton LLP

(57) ABSTRACT

A method is disclosed. The method comprises a receiving a plurality of key-value pairs. The method then generates a random binary matrix of at least weight three. The random binary matrix has a number of non-zero binary values equal to the weight in each row. The method can then assign each key in the plurality of key-value pairs to a row in the random binary matrix. A key matrix can then be generated by appending a dense binary matrix to the random binary matrix. The method can then process the key matrix to output an encoding vector that encodes the values of the plurality of key-value pairs.

20 Claims, 8 Drawing Sheets

| KEY-VALUE DATABASE 100 | | | | | | | |
|---|---|---|---|---|---|---|---|
| KEY ROW 101 | 102938 | 273823 | 419842 | 198729 | 323134 | 887423 | 284971 |
| VALUE ROW 102 | 550 | 630 | 800 | 647 | 750 | 680 | 630 |

(56) References Cited

PUBLICATIONS

Manguoglu, "A Domain-decomposing Parallel Sparse Linear System Solver", Journal of Computational and Applied Mathematics, vol. 236, No. 3, Sep. 1, 2011, pp. 319-325.

Mihaljevic et al., "Security Evaluation and Design Elements for a Class of Randomized Encryptions", IET Information Security, vol. 13, No. 1, Jan. 2019, pp. 36-47.

Application No. PCT/US2022/037302, International Search Report and Written Opinion, Mailed on Oct. 25, 2022, 7 pages.

Peng et al., "Solving Sparse Linear Systems Faster than Matrix Multiplication", Proceedings of the 2021 ACM-SIAM Symposium on Discrete Algorithms (SODA), Jan. 7, 2021, pp. 1-90.

Ramirez-Javega et al., "Adaptive Sampling for Fast Sparsity Pattern Recovery", 19th European Signal Processing Conference, Sep. 2, 2011, pp. 348-352.

| KEY ROW 101 | 102938 | 273823 | 419842 | 198729 | 323134 | 887423 | 284971 |
|---|---|---|---|---|---|---|---|
| VALUE ROW 102 | 550 | 630 | 800 | 647 | 750 | 680 | 630 |

KEY-VALUE DATABASE 100

FAST SOLVERS FOR SPARSE STRUCTURED LINEAR SYSTEMS

CROSS-REFERENCES TO RELATED APPLICATIONS

This application is a 371 application of PCT application number PCT/US2022/037302, filed Jul. 15, 2022, which claims priority to and the benefit of U.S. Provisional Patent Application No. 63/223,349 filed on Jul. 19, 2021, which is herein incorporated by reference.

BACKGROUND

Sparse linear systems are often used to generate encodings of keys and values that correspond to the keys, and may thereafter be stored in key-value databases. An encoded key in a key-value database may be decoded later to retrieve a corresponding encoded value which may subsequently be decoded. However, in order to generate the encodings, many of these sparse linear systems result in two-core cycles that increase the computation complexity of generating the encodings for key-value pairs. The efficiency of performing such encodings, including the rate of encoding, the compactness of encoding, and the time to encode/decode, can be improved.

Embodiments of the disclosure address this problem and other problems individually and collectively.

SUMMARY

One embodiment of the invention includes a method. The method comprises: receiving a plurality of key-value pairs; generating a random binary matrix of at least weight-three, wherein the random binary matrix has a number of non-zero binary values equal to the weight in each row; assigning each key in the plurality of key-value pairs to a row in the random binary matrix; generating a key matrix by appending a dense binary matrix to the random binary matrix; and processing the key matrix to output an encoding vector, wherein the encoding vector encodes the values of the plurality of key-value pairs.

Another embodiment of the invention includes a computer comprising: a processor; and a non-transitory computer readable medium comprising instructions executable by the processor to perform operations including: receiving a plurality of key-value pairs; generating a random binary matrix of at least weight-three, wherein the random binary matrix has a number of non-zero binary values equal to the weight in each row; assigning each key in the plurality of key-value pairs to a row in the random binary matrix; generating a key matrix by appending a dense binary matrix to the random binary matrix; and processing the key matrix to output an encoding vector, wherein the encoding vector encodes the values of the plurality of key-value pairs.

A better understanding of the nature and advantages of embodiments of the invention may be gained with reference to the following detailed description and accompanying drawings.

BRIEF DESCRIPTION OF THE DRAWINGS

FIG. 1 shows a key-value database according to embodiments.

DETAILED DESCRIPTION

Figures 2A, 2B:
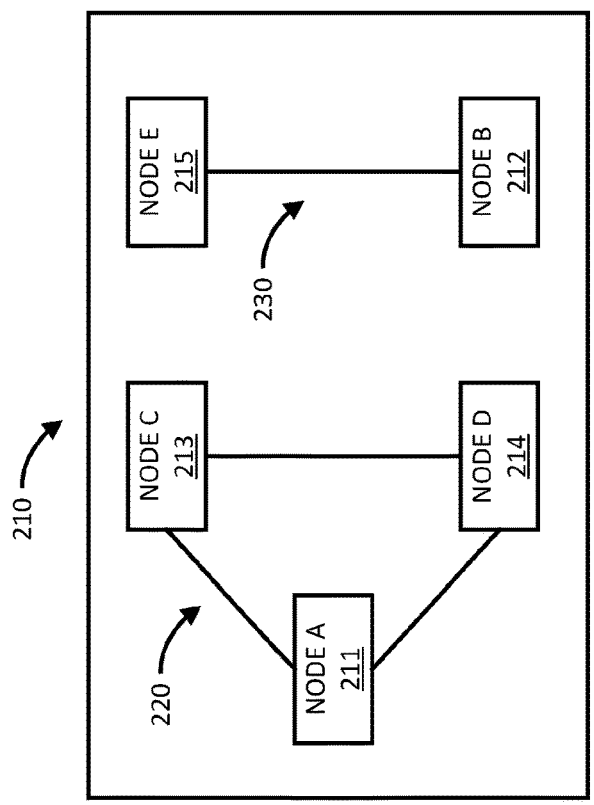
FIGS. 2A and 2B show a weight-two key matrix and its associated cuckoo graph according to embodiments.

A key-value pair consists of two data elements (key and value) that are related to each other and is often used to store large quantities of data. A key can act as a unique identifier for some item of data, and the value can be the data to be identified. Key-value pairs have frequent use is lookup tables, hash tables, etc., that are used to implement dictionaries, inventory lists, databases, etc. Often, key-value pairs are encoded to transform and protect the data in transit or before the key-value pair is stored in a key-value database. The key and/or the value can be encrypted. Once the key-value pair has been received from a transmitting computer to a receiving computer, or when the key-value database is to be accessed, they key-value pair can be decoded to securely provide access the data.

Embodiments provide for a method to encode and decode key-value pairs efficiently. In the encoding process, sets of key-value pairs are encoded through the use of a key matrix. To perform the encoding process, a random sparse binary matrix (a matrix comprising of mostly "0" elements) can be generated and each key of a set of key-value pairs to be encoded can be assigned to a row in the random binary matrix. A dense binary matrix (e.g., a matrix comprising of mostly "1" elements) can then be generated and appended to the random sparse binary matrix to form a key matrix. The key matrix can then be used to generate encoding vectors by reordering the key matrix according to form an approximate lower triangular matrix. The encoding vector can then be used to encode the keys of a set of key-value pairs. Encoded keys may then be decoded by multiplying the encoding vector with a key to retrieve a value.

I. Key-Value Pairs

Key-value pairs include two data elements that are related to each other. Examples of a key-value pair can include an account number/credit score pair, a bank account number/currency amount held pair, a full name/phone number pair, a date/temperature pair, or the like. The key of a key-value pair can uniquely identify the value of the key-value pair. For example, if the key-value pair is an account number/credit score pair, the key can be an account number of an account holder and the key can be used to access a key-value database to retrieve the credit score of the account holder.

A. Key-Value Database

FIG. 1 shows a key-value database 100 according to embodiments. The key-value database 100 consists of a key row 101 that stores keys of a key-value pair, and a value row 102 that stores values of a key-value pair. In some examples, the entries of the key-value database 100 can be encrypted before they are stored. The key-value database 100 stores key-value pairs (hereby denoted by $(z_i, v_i)$, where $z_i$ denotes a key and $v_i$ denotes a value) including (102938, 550), (273823, 630), (419842, 800), (198729, 647), (323134, 750), (887423, 680), and (284971, 630). Although the key-value database 100 shows 7 total key-value pairs, more or less key-value pairs can be stored by similar key-value databases.

The key-value database 100 can be accessed using a key to retrieve a value that corresponds to the key. For example, a user may access the key-value database 100 using the key 102938. The key-value database 100 may search for the key 102938 and determine that a value 550 is stored in relation to the key, and can output the value to the user.

B. Key-Value Pair Encoding

The key-value pairs stored by the key-value database 100 may be encoded to provide for security of the data. Encoded data can only be decoded into plaintext if the decoding process is known. To generate encodings of a set key-value pairs of the key-value databases, a computer can setup a system of linear equations. For a set of n total key-value pairs with keys $Z=(z_1, z_2, z_3, \ldots, z_n)$ and associated values $V=(v_1, v_2, v_3, \ldots, v_n)$, an equation MP=V can be used to generate the encodings, where M is a matrix constructed using the set of keys Z, and P is an encoding vector of length m>n. As this matrix equation is linear, once the encoding vector P is computed, a key $z_i$ can be used to decode the encoding vector P to retrieve a value $v_i$ according to $(P, z_i) = <M_i, P> = v_i$. Such an encoding process has several performance metrics including a rate of encoding m/n (also known as the expansion ratio), and a time to encode/decode. The expansion ratio is a measure of the compactness of the encoding, with ideal encodings providing for an expansion ratio equal to 1. Many current implementations of encodings have rates of encoding of 2 or above. Embodiments provide for an encoding method with a constant runtime for encoding and a linear runtime for decoding.

II. Key Matrices

Encodings of a key-value pair can be generated using a key matrix, e.g., the matrix M mentioned above. A key matrix can be used to determine the encoding of a key-value pair. In examples, key matrices can be binary matrices, meaning each element is "0" or "1.". A binary matrix can be a random binary matrix, meaning each element is randomly assigned to be equal to "0" or "1." A key matrix can be classified by a weight, which determines the number of non-zero binary elements that are equal to "1" in each row of the key matrix. For example, a key matrix of weight 2 has rows where only two elements are equal to "1" and the rest are equal to "0." As described by the equation $(P, z_i) = <M_i, P> = v_i$, the rows of the key matrix M identified by a key $z_i$ allows a user decode the encoding vector P to retrieve a value $v_i$.

A. Weight-Two Key Matrix

Key matrices can be of any weight w. An example of a key matrix of weight-two is described with reference to FIGS. 2A and 2B.

FIGS. 2A and 2B show a weight-two key matrix 200 and its associated cuckoo graph 210 according to embodiments. The weight-two key matrix 200 is a random binary matrix of weight-two, meaning that is has two randomly placed elements in each row that are equal to "1" and the rest are equal to "0." The weight-two key matrix 200 can be generated randomly (e.g., using a random or pseudorandom number generated to determine the placement of "1" elements in each row), using the restriction given by the weight to limit the number of "1" elements in each row. The weight-two key matrix 200 has four rows, each of which can be assigned to one of four keys $(z_1, z_2, z_3, z_4)$ randomly. For example, as shown in FIG. 2A, the first key $z_1$ can be assigned to the first row (1, 0, 1, 0, 0), the fourth key $z_4$ can be assigned to the second row (0, 1, 0, 0, 1), the second key $z_2$ can be assigned to the third row (1, 0, 0, 1, 0), and the third key $z_3$ can be assigned to the fourth row (0, 0, 1, 1, 0).

All five columns 201-205 of the weight-two key matrix 200 can be equivalently represented by nodes 211-215 of the cuckoo graph 210. In the cuckoo graph 210, a key can be represented by a line connecting two nodes of the non-zero columns of the key. For example, the first key $z_1$ has non-zero values in column A 201 and column C 203, and as such the first key $z_1$ can be represented by a line connecting node A 211 and node C 213. Similarly, the second key $z_2$ having non-zero values in column A 201 and column D 204 can be represented by a line connecting node A 211 and node D 214, the third key $z_3$ having non-zero values in column C 203 and column D 204 can be represented by a line connecting node C 213 and node D 214, and the fourth key $z_4$ having non-zero values in column B 202 and column E 205 can be represented by a line connecting node B 212 and node E 215.

A two core cycle 220 in the cuckoo graph 210 is formed by the connections between the first key $z_1$, the second key $z_2$, and the third key $z_3$. The two core cycle 220 can be seen in the weight-two key matrix 200, by traversing from the "1" in the first row at column A 201 to the right towards the "1" in the first row column C 203, then down to "1" in the fourth row at column C 203, then right to the "1" in the fourth row at column D 204, then up to the "1" in the third row at column D 204, then to the "1" in the third row at column A 201, and finally returning to the "1" in the first row at column A 201. A linear cycle 230 in the cuckoo graph 210 is formed by the fourth key $z_4$, as it has no connections to any other key.

The presence of a two-core cycle causes difficulties in generating encodings. For example, in the equation used to compute encoding vectors, MP=V, the presence of a two-core cycle results in a matrix inversion of $n^2$ complexity to be performed.

B. Weight-Three Key Matrix

An example of a key matrix of weight-three is described with reference to FIGS. 3A and 3B.

Figures 3A, 3B:
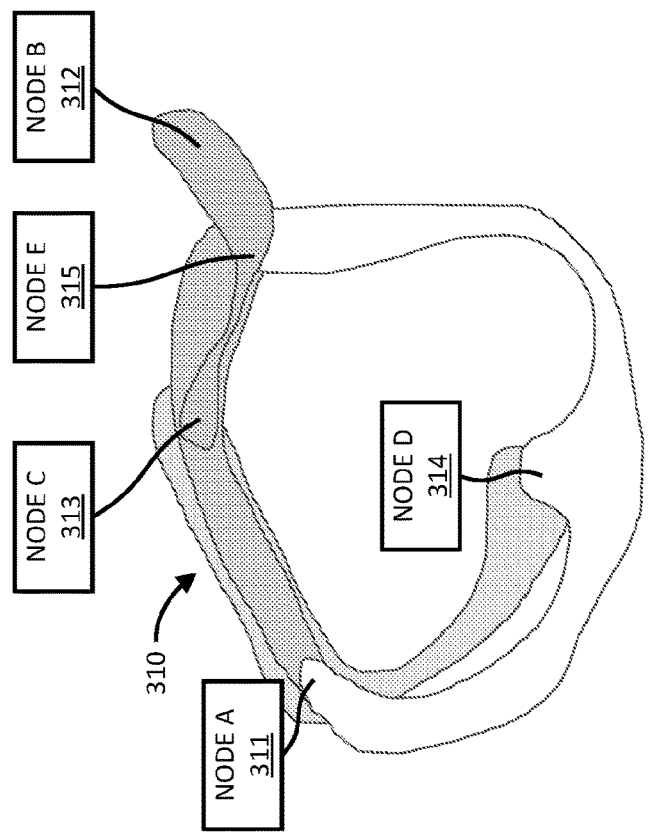
FIGS. 3A and 3B show a weight-three key matrix and its associated cuckoo hypergraph according to embodiments.

FIGS. 3A and 3B show a weight-three key matrix 300 and its associated cuckoo hypergraph 310 according to embodiments. The weight-three key matrix 300 is a random binary matrix of weight-three, meaning that is has three randomly placed elements in each row that are equal to "1" and the rest are equal to "0." Similar to the above weight-two key matrix 200, the weight-three key matrix 300 can be generated randomly (e.g., using a random or pseudorandom number generated to determine the placement of "1" elements in each row), using the restriction given by the weight to limit the number of "1" elements in each row. The weight-three key matrix 300 has four rows, which can be assigned to one of four keys $(z_1, z_2, z_3, z_4)$ randomly. For example, as shown in FIG. 2A, the first key $z_1$ can be assigned to the first row (1, 0, 1, 1, 0), the fourth key $z_4$ can be assigned to the second row (0, 1, 1, 0, 1), the second key $z_2$ can be assigned to the third row (1, 0, 0, 1, 1), and the third key $z_3$ can be assigned to the fourth row (0, 1, 0, 1).

All five columns 301-305 of the weight-three key matrix 300 can be equivalently represented by nodes 311-315 of the cuckoo hypergraph 310. The cuckoo hypergraph 310 is a three-dimensional equivalent representation of the weight-three key matrix 300. Similar to the cuckoo graph 210 of FIG. 2B, the cuckoo hypergraph 310 represents the columns of its associated key matrix as nodes in three dimensional space, and a key is represented by a line connecting the three non-zero nodes of the key. For example, the first key $z_1$ has non-zero values in column A 301, column C 203, and column D 304, as such the first key $z_1$ can be represented by a line connecting node A 311, node C 313, and node D 314. A similar procedure is performed to represent the second key $z_2$, the third key $z_3$, the fourth key $z_4$ as lines in a three dimensional space to form the cuckoo hypergraph 310. In the cuckoo hypergraph 310, a two-core cycle is formed by the connections between node A 311, node C 313, node E 315, and node D 314. The two-core cycle of the cuckoo hypergraph 310 (similar to the two-core cycle of the cuckoo graph 210) results in increased computational complexity to generate the encodings due to the matrix inversion of $n^2$ complexity.

Key matrices of higher weights can be associated with higher dimensional cuckoo graphs. For example, a key matrix of weight five would have an equivalent five-dimensional cuckoo graph representation. Two-core cycles can appear in any key matrix of weight greater than 1, and result in a similar issue of increasing the computational complexity.

C. Two-Core Cycles

As described above, two-core cycles in key matrices result in greater computational complexity to solve compute the encoding vector P using the equation MP=V due to the inversion of the matrix M. Larger two-core cycles have a greater effect on the hit to performance of computing the encoding vector P. To ensure the probability that a two-core cycle exists in a key matrix is low, an expansion ratio of the key matrix can be chosen and a dense matrix portion can be appended to an existing key matrix. As opposed to the key matrix columns seen in FIGS. 2A and 3A, the rows of a dense matrix portion can have any number of "1" elements. To generate a dense matrix portion, a random or pseudo-random number generator can be used to place "1" elements. For example, a dense matrix portion may be generated such that there is a 50% chance that any element in the dense matrix portion is equal to "1" (and is otherwise equal to "0"), such that the dense matrix portion has a greater number of non-zero binary values than zero binary values.

Figure 4:
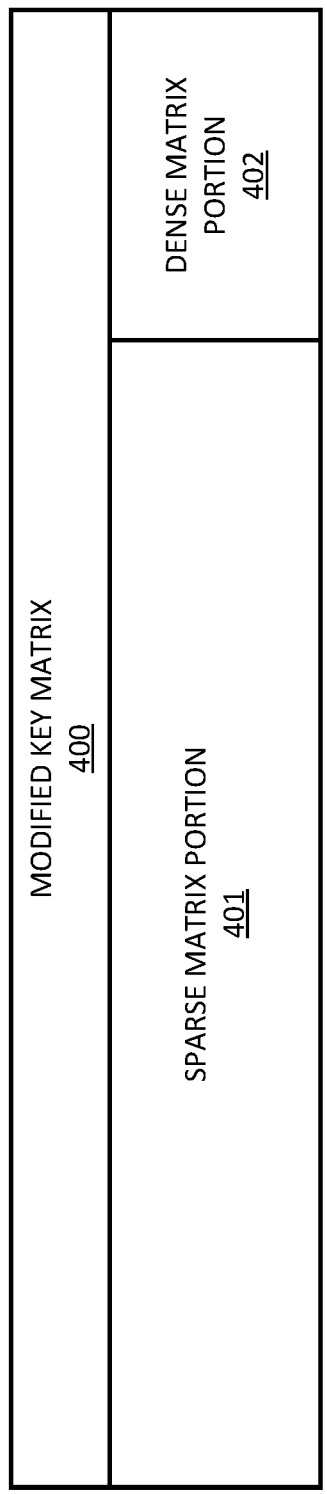
FIG. 4 shows a modified key matrix according to embodiments.

FIG. 4 shows a modified key matrix 400 according to embodiments. The modified key matrix 400 comprises a sparse matrix portion 401 (e.g., a key matrix similar to the weight-two key matrix 200 of FIG. 2A or the weight-three key matrix 300 of FIG. 3A) and a dense matrix portion 402. The sparse matrix portion 401 can be a key matrix of any general weight w.

The size of the sparse matrix portion 401 determines the expansion ratio m/n (also known as the expansion ratio), where m is the number of columns of the matrix and n is the number of rows of the matrix. Lowering the expansion ratio results in a more compact matrix (e.g., a more compact encoding), but an increase in the size of two-core cycles. As examples, the sparse matrix portion 401 may be a matrix that has fewer than 10%, 5%, 1%, 0.1%, 0.001, or 0.0001% non-zero binary values in each row (or equivalently 90%, 95%, 99%, 99.9% zero values in each row). As described above, larger two-core cycles have a significant impact on the computational complexity of compute encodings. For a key matrix of weight-three, an expansion ratio of 1.23 can be chosen to reduce the probability that a two-core cycle exists, as shown by FIG. 1 of A. Dembo, A. Montanari, "Finite size scaling for the core of large random hypergraphs," arXiv: math/0702007. Matrices of other weights have similar phase transitions, where key matrices with expansion ratios greater than some threshold have a low probability of containing a two-core cycle. For example, a matrix of weight five has a threshold of 1.45 to reduce the probability of finding a two-core cycle.

The dense matrix portion 402 may be a dense matrix generated using a random number generator. In one example, the random number generator can generate the denser matrix portion 402 such that the dense matrix portion 402 has a 50% ratio of non-zero binary values. In other examples, the dense matrix portion 402 may be a matrix that has greater than 50%, 60%, 70%, 80%, or 90% non-zero binary values in each row. The addition of the dense matrix portion 402 to the sparse matrix portion 401 provides for a high probability that the matrix as a whole is easily invertible to solve the equation MP=V. For matrices of greater weight, a smaller dense matrix portion 402 is required to lower the probability of containing a two-core cycle. For example, for a matrix of weight five, the dense matrix portion 402 does not have a large impact on the probability that the modified key matrix 400 is invertible. Thus, in some examples, for a matrix of at least weight five, dense matrix portion 402 may be of width zero (e.g., no dense matrix portion is appended to the original key matrix). Further, in some examples, the width of the dense matrix portion 402 may be determined based on the expansion ratio of the sparse matrix portion 401. For example, lower expansion ratios tend to have larger two core sizes, and as such a dense matrix portion 402 of larger width may be desired.

D. Duplicate Rows

Two-core cycles can additionally be formed by the existence of a duplicate row in a key matrix. The probability that a duplicate row exists, and therefore a two-core cycle exists, is equal to $$\frac{C(m, 2)}{C(n, w)} \approx \frac{m^2}{n^w} \approx \frac{1}{n^{w-2}},$$

where m is the number of columns of the matrix, n is the number of rows of the matrix, and w is the weight the matrix. For a key matrix of weight-three, the probability scales to the inverse of the number of keys to be encoded. A large weight reduces the chance of duplicate rows, but increases the expansion ratio required to reduce the probability that a two-core exists.

Figure 5:
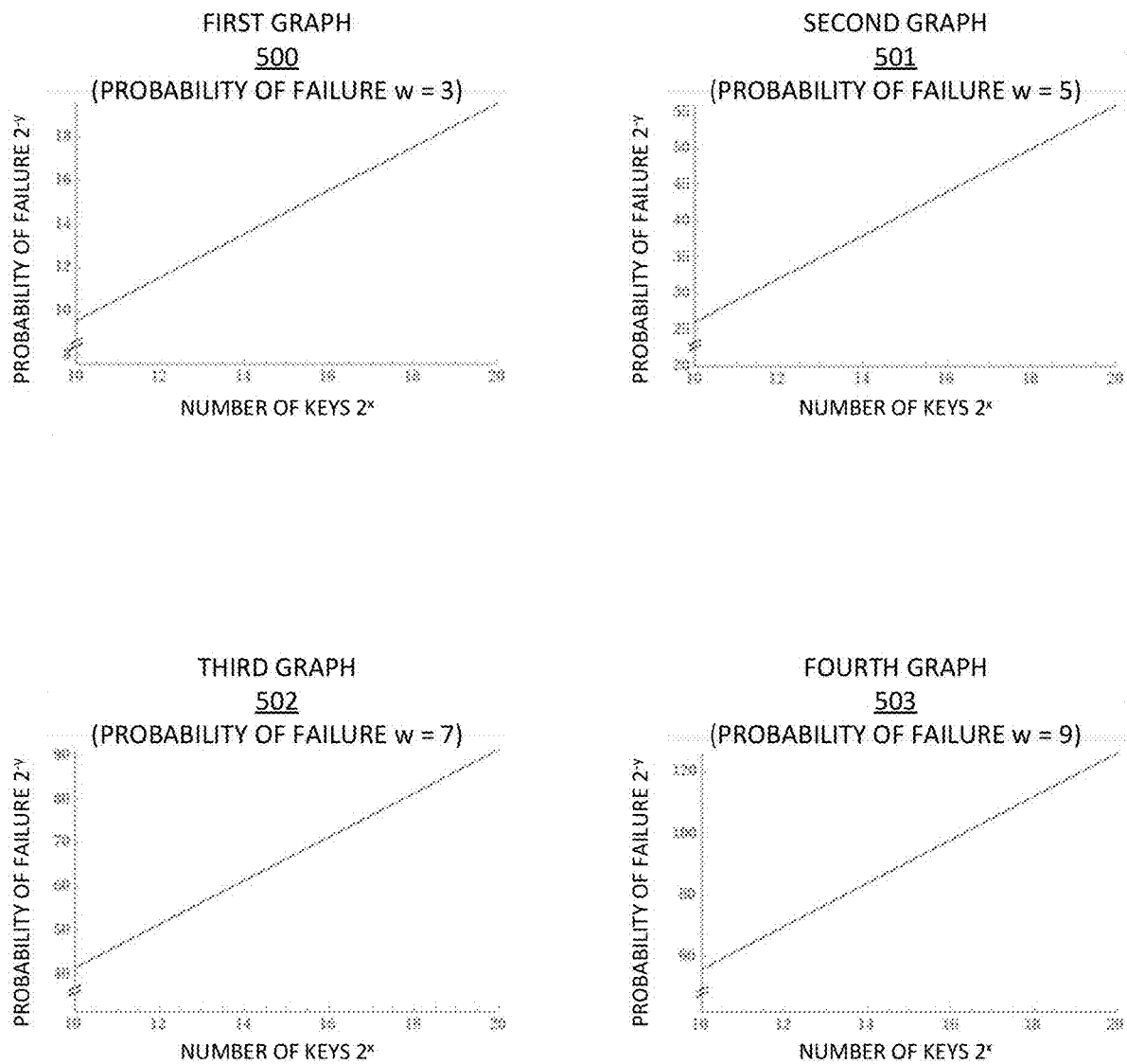
FIG. 5 shows graphs of probabilities of failure to encode vs number of keys for various weights according to embodiments.

FIG. 5 shows graphs probabilities of failure to encode vs number of keys for various weights according to embodiments. Each of the graphs shown have a y-axis scaled to $2^{-y}$ and an x-axis scaled to $2^x$. The probability of failure to encode vs number of keys for a weight w is plotted as −

$$\log_2\left(\left(\frac{2^m}{2}\right) \Big/ \left(\frac{1.3 \times 2^m}{w}\right)\right).$$

A first graph 500 shows the probability of failure to encode vs a number of keys for a key matrix of weight-three. A second graph 501 shows the probability of failure to encode vs a number of keys for a key matrix of weight five. A third graph 502 shows the probability of failure to encode vs a number of keys for a key matrix of weight seven. A fourth graph 503 shows the probability of failure to encode vs a number of keys for a key matrix of weight nine.

To properly encode keys, a very low probability to fail is desired. An exemplary probability that the encoding is guaranteed to succeed is $2^{-40}$. For the first graph 500, the desired probability (e.g., y=40) is not reached in the range shown (e.g., it is not reached when encoding a number of keys $2^{10}$ through $2^{20}$). For the second graph 501, the desired probability is reached for encoding a number of keys above $2^{15}$. For the third graph 502 and the fourth graph 503, the desired probability is reached before encoding a number of keys above $2^{10}$.

As shown by the graphs, a larger weight results in a lower number of keys to be encoded such that the desired probability of the encoding to fail is reached. However, as described above, a key matrix of higher weight requires a larger expansion ratio to have a low probability that a two-core cycle exists in the key matrix (e.g., the sparse matrix portion 401 of FIG. 4). Thus, if the weight of a key matrix is increased, the probability of a two-core cycles due to a duplicate row in the sparse matrix portion is lowered, but the expansion ratio should be increased to guarantee there are no other two-core cycles in the sparse matrix portion (e.g., two-core cycles similar to the ones described by FIGS. 2A/2B and FIGS. 3A/3B). The increase in the expansion ratio for higher weights also increases the computational complexity of computing the encodings, and as such selecting a weight of a key matrix has a competing tradeoff between removing duplicates due to duplicates and an increasing expansion ratio to remove other two-core cycles.

III. Approximate Lower Triangular Matrix

Choosing the proper expansion ratio reduces the probability of finding two-core cycles similar to those of FIGS. 2A/2B and FIGS. 3A/3B to be very close to zero. However, two-core cycles that are the result of duplicate rows are more likely to exists when encoding a smaller number of keys.

Figure 6:
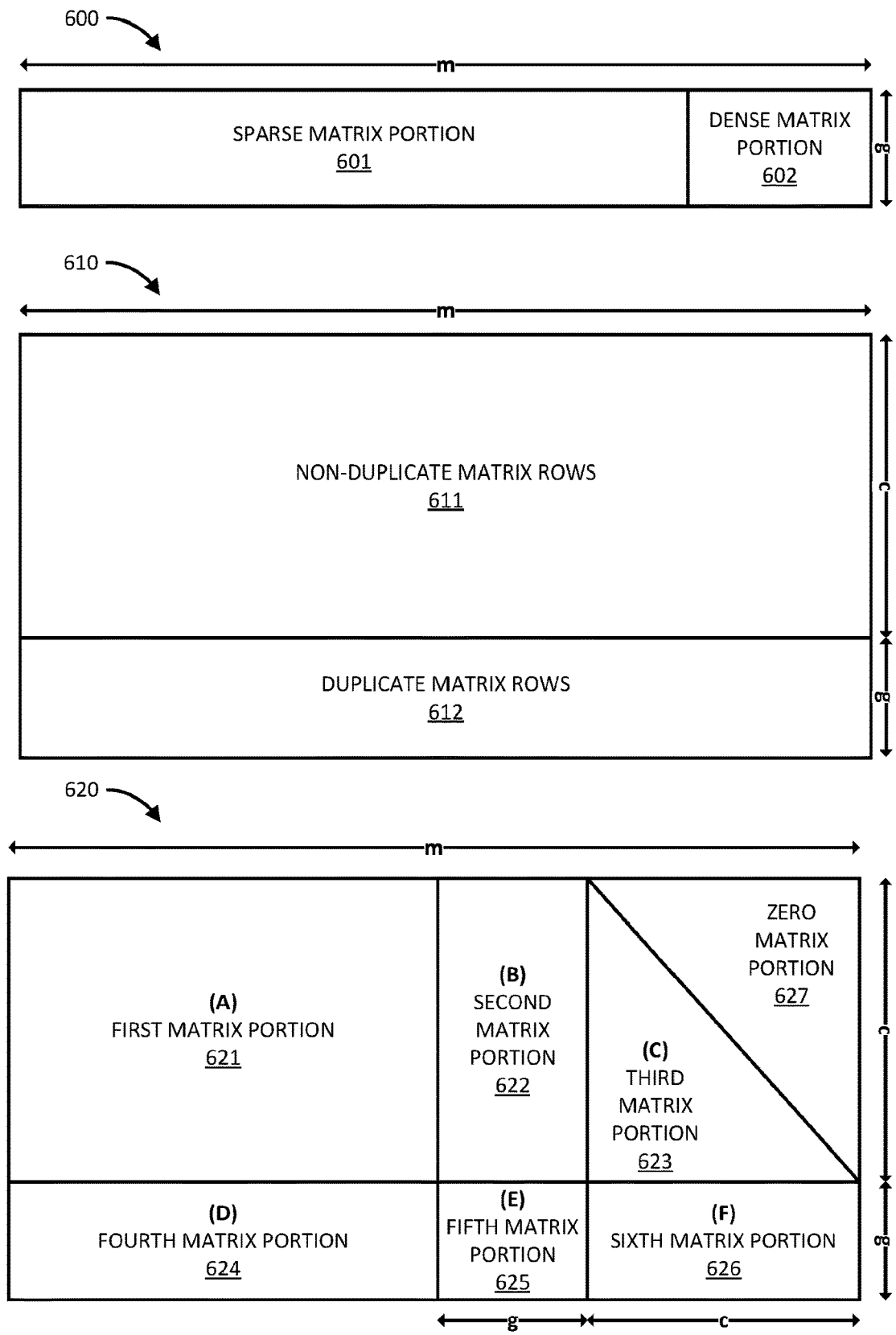
FIG. 6 shows an approximate lower triangular matrix formed from an initial key matrix according to embodiments.

FIG. 6 shows an approximate lower triangular matrix 620 formed from an initial key matrix 600 according to embodiments. The approximate lower triangular matrix 620 can be generated by processing an initial key matrix 600. It is assumed that there are little to no two-core cycles outside of those generated by duplicate rows (e.g., the correct expansion ratio of the initial key matrix was chosen such that the probability of such a two-core cycle is very close to zero). In the example shown by FIG. 6, it is assumed a matrix similar to the modified key matrix 400 of FIG. 4 is used.

As a first step, a total of g duplicate rows of the initial key matrix 600 may be identified and then be moved to the bottom of a reordered key matrix 610.

Next, the columns of the reordered key matrix 610 can be permutated such that the top right of the matrix is zero, and the diagonal is non-zero to form the approximate lower triangular matrix 620. A first matrix portion 621(A) and a fourth matrix portion 624 (D) correspond to a subset of the columns of the sparse matrix portion 601. A second matrix portion 622 (B) and a fifth matrix portion 625 (E) correspond to a subset of the columns of the dense matrix portion 602. A third matrix portion 623 (C), a sixth matrix portion 626 (F), and the zero matrix portion 627 correspond to a subset of the columns of the sparse matrix portion 601 that were permuted to make the top right of the approximate lower triangular matrix 620 equal to zero.

The third matrix portion 623 and the zero matrix portion 627 form a lower triangular matrix, so the approximate lower triangular matrix 620 may be multiplied by [I–FC$^{-1}$I] to zero out the sixth matrix portion 626 and thus forming the following matrix:

$$\begin{bmatrix} A & B & C \\ D' & E' & 0 \end{bmatrix}$$

where D'=−FC$^{-1}$A+D and E'=−FC$^{-1}$B+E. The encoding vector P=[p$_1$, p$_2$] from the equation MP=V can then be calculated using the following equations:

$$p_1^T = -E'^{-1}(D'V^T) = -E'^{-1}(-F(C^{-1}(AV^T)) + DV^T)$$

$$p_2^T = -C'^{-1}(AV^T + Bp_1^T)$$

The encoding vector P encodes each value $v_i$, and can be decoded using a key $z_i$. This is because the key $z_i$ was assigned to a random row in the matrix M, and as such it determines which values of the encoding vector P are to be summed in order to retrieve the value $v_i$ corresponding to the key $z_i$ (e.g., (P, $z_i$)=<M$_i$, P>=$v_i$).

IV. Method

Figure 7:
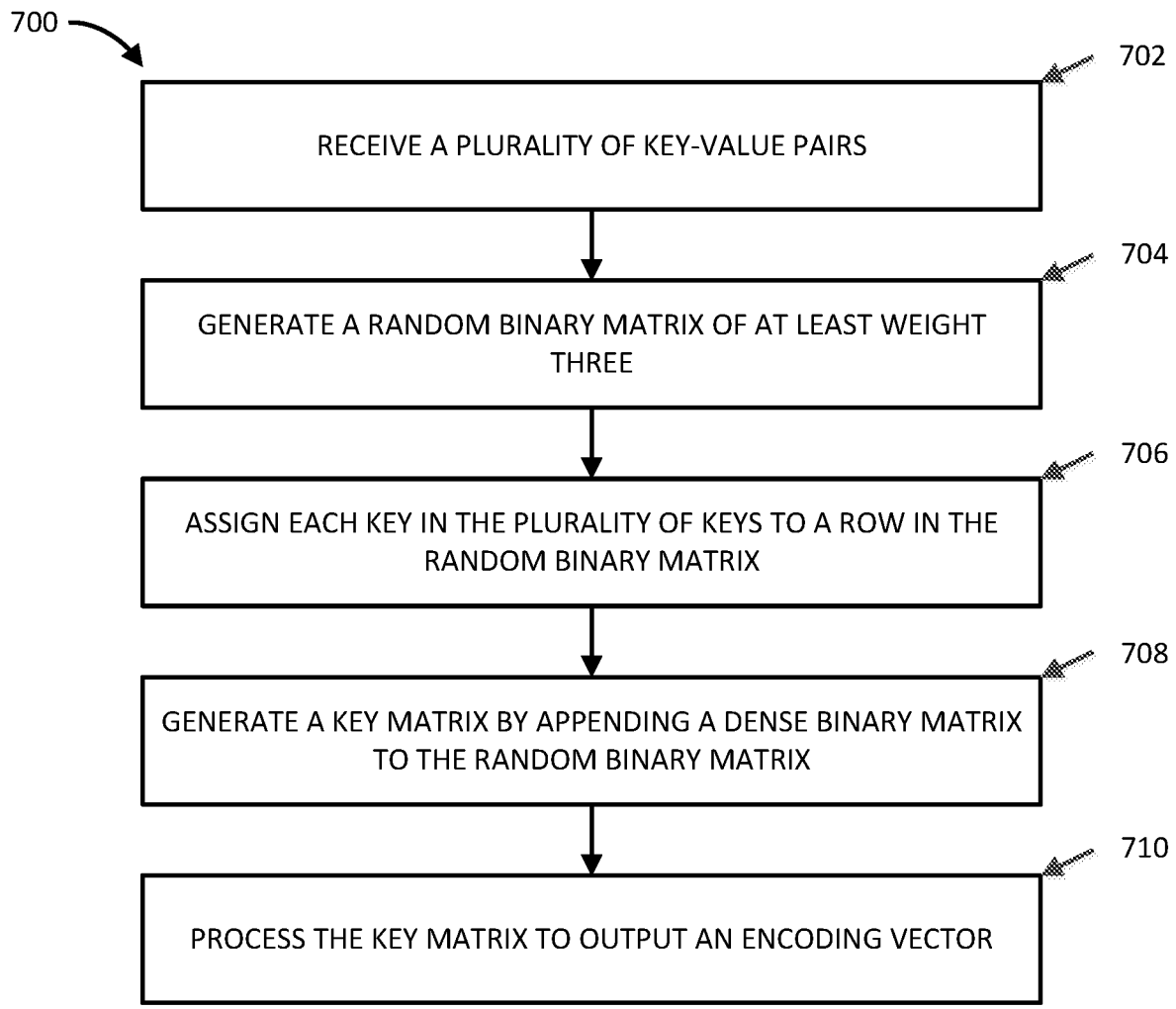
FIG. 7 shows a flowchart for a method according to embodiments.

FIG. 7 shows a flowchart for a method 700 according to embodiments.

At step 702, the computer can receive a plurality of key-value pairs ($z_i$, $v_i$). The computer can receive any number of key-value pairs, such as $2^5$, $2^{10}$, $2^{15}$, $2^{20}$, etc. After receiving the plurality of key-value pairs, the computer may store the key-value pairs in a key-value database, such as the key-value database 100 of FIG. 1. For example, the computer can receive a plurality of key-value pairs corresponding to an account number/credit score pair, a bank account number/currency amount held pair, a full name/phone number pair, a date/temperature pair, or the like. In some examples, after receiving a key-value pair, the computer may encrypt the key-value pair to form an encrypted key-value pair before storing the encrypted key-value pair in a key-value database.

At step 704, the computer can generate a random binary matrix of at least weight-three. To generate the random binary matrix, the computer can select a weight of above three and then use a random or pseudorandom number generator to generate the random binary matrix by placing a number of non-zero binary values equal to the weight in each row. For example, the computer may select a weight of three to generate the weight-three key matrix 300 of FIG. 3A by placing values of "1" randomly. In some examples, the computer can further determine an rate of encoding, or expansion ratio, (e.g., the ratio of the width of the random binary matrix to the height of the random binary matrix) of the random binary matrix based on the weight. For example, for a random binary matrix of weight-three, the computer can generate the random binary matrix with an expansion ratio of at least 1.23.

At step 706, the computer can assign each key in the plurality of keys to a row in the random binary matrix. In some examples, the keys can assigned to a random row of the random binary matrix. For example, as described by FIG. 3A, the computer can randomly assign one of four keys to one of four rows in the weight-three key matrix 300.

At step 708, the computer can generate a key matrix by appending a dense binary matrix to the random binary matrix. In some examples, the width of the dense binary matrix can be determined based on the expansion ratio of the random binary matrix. For random binary matrices with lower expansion ratios, a dense binary matrix of larger width may be desired. In other examples, the width of the dense binary matrix can be determined based on the weight of the random binary matrix. For matrices of larger width, dense binary matrices of lower width may be desired. For example, for a random binary matrix of weight five, a dense binary matrix of width equal to zero may be appended to the random binary matrix (e.g., no dense binary matrix is appended).

At step 710, the computer can process the key matrix to output an encoding vector. For example, as described by FIG. 6, the computer can first determine a number of duplicate rows in the initial key matrix 600. The computer can then reorder the rows of the initial key matrix 600 such that the duplicate rows are at the bottom of the reordered key matrix 610. The computer can then generate an approximate lower triangular matrix 620 from the reordered key matrix 610 by permuting the columns of the reordered key matrix 610. The computer may then calculate an encoding vector P by zeroing out the sixth matrix portion 626, and solving the equation MP=V by using $$p_1^T \text{ and } p_2^T$$

as shown above to output the encoding vector P. The encoding vector P encodes the values of the plurality of key-value pairs received.

The encoding vector P can be subsequently decoded using a key $z_i$, by multiplying the encoding vector P by the key $z_i$ to retrieve the value $v_i$. For example, if the key-value pairs are bank account numbers/currency amount held pairs, the computer can receive instruction from a user u wishing to check their bank account balance to retrieve the value $v_u$ associated with their account number $z_u$. The computer can retrieve the value $v_u$ held in the user's bank account using by multiplying the encoding vector P with the account number $z_u$ (e.g., $z_u P = v_u$). In some examples, when the key-value pair are encrypted before being stored in the key-value database, the computer may then decrypt the encrypted value to obtain the value corresponding to the key after decoding.

V. Computer System

Figure 8:
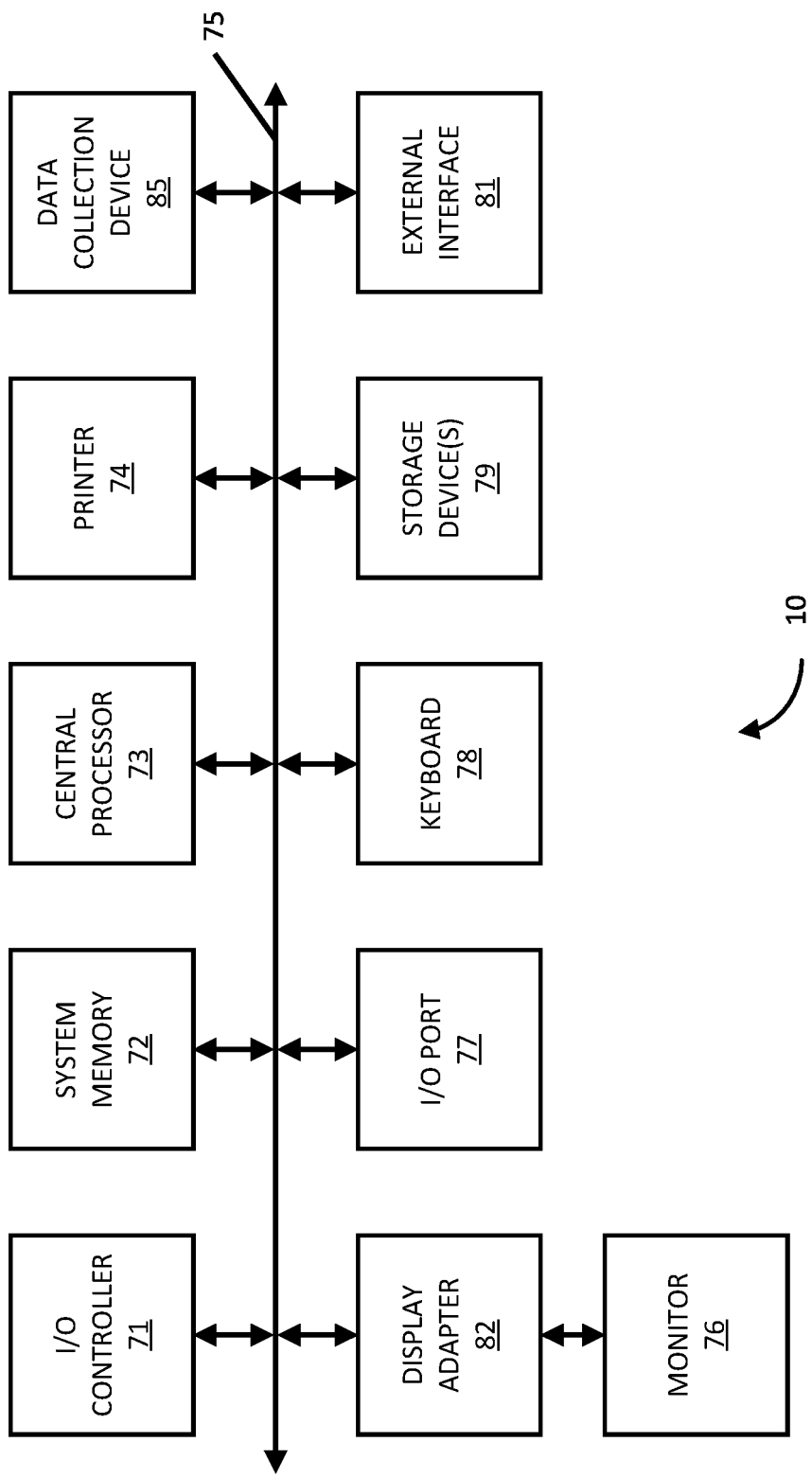
FIG. 8 shows a block diagram of an exemplary computer system according to embodiments.

FIG. 8 shows a block diagram of an exemplary computer system 10 according to embodiments of the present invention.

Any of the computer systems mentioned herein may utilize any suitable number of subsystems. Examples of such subsystems are shown in FIG. 8 in computer apparatus 10. In some examples, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some examples, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein and in the appendix are incorporated by reference in their entirety for all purposes. None is admitted to be prior art. Where a conflict exists between the instant application and a reference provided herein, the instant application shall dominate.

What is claimed is:

1. A method for encoding keys by a computer, the method comprising:
   receiving a plurality of key-value pairs;
   generating a random binary matrix of at least weight-three, wherein the random binary matrix has a number of non-zero binary values equal to the weight in each row;
   assigning each key in the plurality of key-value pairs to a row in the random binary matrix;
   generating a key matrix by appending a dense binary matrix to the random binary matrix; and
   processing the key matrix to output an encoding vector, wherein the encoding vector encodes the values of the plurality of key-value pairs.

2. The method of claim 1, wherein processing the key matrix comprises:
   generating a random binary matrix of at least weight-three, wherein the random binary matrix has a number of non-zero binary values equal to the weight in each row;
   assigning each key in the plurality of key-value pairs to a row in the random binary matrix;
   generating a key matrix by appending a dense binary matrix to the random binary matrix; and
   processing the key matrix to output an encoding vector, wherein the encoding vector encodes the values of the plurality of key-value pairs.

3. The method of claim 1, further comprising:
   decoding the encoding vector by multiplying the encoding vector by a key of the plurality of key-value pairs to retrieve the value corresponding to the key.

4. The method of claim 1, wherein the random binary matrix is generated using a random or pseudorandom number generated used to determine a position of the non-zero binary values in each row of the random binary matrix.

5. The method of claim 1, wherein the random binary matrix is classified by an expansion ratio, and wherein the expansion ratio is determined based on the weight of the random binary matrix.

6. The method of claim 5, wherein the random binary matrix is of weight-three and has an expansion ratio of at least 1.23, or wherein the random binary matrix is of weight five and has an expansion ratio of at least 1.45.

7. The method of claim 5, wherein a width of the dense binary matrix is determined based on the expansion ratio of the random binary matrix.

8. The method of claim 5, wherein the random binary matrix is of at least weight five, and wherein the dense binary matrix is of width zero.

9. The method of claim 1, wherein the number of key-value pairs received is greater than $2^{10}$.

10. The method of claim 1, further comprising, after receiving the plurality of key-value pairs:
    encrypting the key-value pairs.

11. The method of claim 10, further comprising:
    decoding the encoding vector by multiplying the encoding vector by a key of the plurality of key-value pairs to retrieve an encrypted value corresponding to the key; and
    decrypting the encrypted value to obtain the value corresponding to the key.

12. The method of claim 1, wherein the dense binary matrix comprises a greater number of non-zero binary values than zero binary values.

13. The method of claim 1, wherein each key of the plurality of key-value pairs uniquely identifies the value of the specific key-value pair.

14. The method of claim 1, wherein the plurality of key-value pairs are stored in a key-value database.

15. A computer comprising:
    a processor; and
    a non-transitory computer readable medium comprising instructions executable by the processor to perform a method of 14 a method for encoding keys by a computer, the method comprising:
    receiving a plurality of key-value pairs;
    generating a random binary matrix of at least weight-three, wherein the random binary matrix has a number of non-zero binary values equal to the weight in each row;
    assigning each key in the plurality of key-value pairs to a row in the random binary matrix;
    generating a key matrix by appending a dense binary matrix to the random binary matrix; and
    processing the key matrix to output an encoding vector, wherein the encoding vector encodes the values of the plurality of key-value pairs.

16. The computer of claim 15, wherein processing the key matrix comprises:
    generating a random binary matrix of at least weight-three, wherein the random binary matrix has a number of non-zero binary values equal to the weight in each row;
    assigning each key in the plurality of key-value pairs to a row in the random binary matrix;
    generating a key matrix by appending a dense binary matrix to the random binary matrix; and
    processing the key matrix to output an encoding vector, wherein the encoding vector encodes the values of the plurality of key-value pairs.

17. The computer of claim 15, wherein the method further comprises:
    decoding the encoding vector by multiplying the encoding vector by a key of the plurality of key-value pairs to retrieve the value corresponding to the key.

18. The computer of claim 15, wherein the random binary matrix is generated using a random or pseudorandom number generated used to determine a position of the non-zero binary values in each row of the random binary matrix.

19. The computer of claim 15, wherein the random binary matrix is classified by an expansion ratio, and wherein the expansion ratio is determined based on the weight of the random binary matrix.

20. The computer of claim 15, wherein the method further comprises:
    after receiving the plurality of key-value pairs, encrypting the key-value pairs;
    decoding the encoding vector by multiplying the encoding vector by a key of the plurality of key-value pairs to retrieve an encrypted value corresponding to the key; and
    decrypting the encrypted value to obtain the value corresponding to the key.

* * * * *